US009548984B2

(12) United States Patent
Fries et al.

(10) Patent No.: US 9,548,984 B2
(45) Date of Patent: Jan. 17, 2017

(54) AUTHORIZING A USER BY MEANS OF A PORTABLE COMMUNICATIONS TERMINAL

(71) Applicant: Siemens Aktiengesellschaft, Munich (DE)

(72) Inventors: Steffen Fries, Baldham (DE); Andreas Güttinger, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/420,269

(22) PCT Filed: Jun. 20, 2013

(86) PCT No.: PCT/EP2013/062884
§ 371 (c)(1),
(2) Date: Feb. 6, 2015

(87) PCT Pub. No.: WO2014/023468
PCT Pub. Date: Feb. 13, 2014

(65) Prior Publication Data
US 2015/0215321 A1  Jul. 30, 2015

(30) Foreign Application Priority Data
Aug. 7, 2012 (DE) .................. 10 2012 214 018

(51) Int. Cl.
*H04L 29/06* (2006.01)
*G06F 21/00* (2013.01)
*H04W 12/08* (2009.01)

(52) U.S. Cl.
CPC ......... *H04L 63/101* (2013.01); *H04L 63/0807* (2013.01); *H04L 63/0838* (2013.01); *H04W 12/08* (2013.01)

(58) Field of Classification Search
CPC ............... H04L 63/101; H04L 63/0838; H04L 63/0807; H04W 12/08
See application file for complete search history.

(56) References Cited

U.S. PATENT DOCUMENTS 5,315,657 A * 5/1994 Abadi ..................... G06F 9/468
340/5.74
7,716,489 B1    5/2010 Anderson et al.
(Continued)

FOREIGN PATENT DOCUMENTS

DE    102007046079 A1    4/2009
DE    102006006804 B4    8/2010
(Continued)

*Primary Examiner* — Lisa Lewis
(74) *Attorney, Agent, or Firm* — Cozen O'Connor (57) ABSTRACT

A method and system for authorizing a user at a field device by a portable communications device. A first information is acquired by the portable communications device for identifying the field device. The portable communications device sends to a system the first information and a second information for identifying at least one of (i) the portable communications device, and (ii) the user thereof. The system determines a first piece of access information on the basis of the first information and the second information, and sends the first piece of access information to the portable communications device. The portable communications device transmits the second information and the first piece of access information to the field device. The field device determines a second piece of access information on the basis of the second information, and compares the first piece of access information with the second piece of access information. Access to the field device is allowed upon determining that the first piece of access information and the second piece of access information match.

10 Claims, 2 Drawing Sheets

(56) References Cited

U.S. PATENT DOCUMENTS

| | | | | |
|---|---|---|---|---|
| 2007/0005963 A1* | 1/2007 | Eldar | ............... | G06F 21/6209 |
| | | | | 713/168 |
| 2009/0198697 A1* | 8/2009 | Bilger | ............... | G06F 21/6227 |
| 2009/0276840 A1* | 11/2009 | Cao | ............... | H04L 9/3226 |
| | | | | 726/9 |
| 2012/0096526 A1* | 4/2012 | Brahmanapalli | ..... | H04L 9/3234 |
| | | | | 726/6 |
| 2015/0170443 A1* | 6/2015 | Bower | ............... | G06F 21/105 |
| | | | | 340/5.6 |
| 2016/0112429 A1* | 4/2016 | Sundaresan | ............ | H04L 63/08 |
| | | | | 726/4 |

FOREIGN PATENT DOCUMENTS

| | | | |
|---|---|---|---|
| EP | 2442528 A1 | 4/2012 | |
| WO | WO 2009128854 A1 | 10/2009 | |

\* cited by examiner

AUTHORIZING A USER BY MEANS OF A PORTABLE COMMUNICATIONS TERMINAL

CROSS-REFERENCE TO RELATED APPLICATIONS

This is a U.S. national stage of application No. PCT/EP2013/062884, filed on Jun. 20, 2013, which claims priority to the German Application No. DE 102012214018.2 filed Aug. 7, 2012, the content of both incorporated herein by reference.

BACKGROUND OF THE INVENTION

1. Field of the Invention

The application generally relates to a method and an access control system for authorizing a user at a field device by a portable communications device.

2. Related Art

The use of role-based access control (RBAC) is being transferred increasingly from the preserve of telecommunications to the automation sector. Role-based access control makes use of the facility to assign a plurality of subjects, in particular real users, to a category, i.e. a role. Subjects assigned to a shared role are thereby assigned shared functions and permissions. Using role-based access control thus simplifies the administration of permissions, for instance on individual field devices in a system. For example, a real user no longer needs to be administered by his permissions but authenticates himself at the field device using an item of role information and associated authorization evidence and can perform actions commensurate with his role. In this regard, the field device now only implements the assignment of roles to permissions.

Existing approaches to providing a device with the authorization evidence belonging to a role include techniques such as the use of USB sticks or smartcards or connection to a downstream infrastructure. However, physical interfaces are needed for each authentication process using USB sticks, smartcards or similar auxiliary authentication. A connection between the auxiliary authentication device and the field device needs to be established, for instance by inserting a smartcard. This is normally followed by clearance by an associated password.

One of the problems here is that field devices, especially those with a relatively old date of manufacture, do not support the technique described above or do not have a suitable interface. In addition, the auxiliary authentication device must always be carried on the person to be authorized, so for instance a USB stick must always be provided for logging onto a device.

Patent DE 10 2007 046 079 A1 discloses using one-off passwords in the automation sector for remote-maintenance access.

SUMMARY OF THE INVENTION

In view of the foregoing, it is an object of the present application to provide a method and an access control apparatus that enable simplified access to a field device.

In one embodiment, a method for authorizing a user at a field device by a portable communications device comprises the following steps:

The portable communications device acquires first information for identifying the field device. The portable communications device sends to a system the first information and sends second information for identifying the portable communications device or the user thereof. The system determines a first piece of access information on the basis of the first information and the second information, and sends the first access information to the portable communications device. The portable communications device transmits the second information and the first piece of access information to the field device. The field device determines a second piece of access information on the basis of the second information, and compares the first piece of access information with the second piece of access information. If the first piece of access information and the second piece of access information match, access to the field device is allowed.

In the present patent application, the first information and second information are understood to mean identifying information such as, for example, serial numbers of a field device or role information of a user. This information hence identifies the elements of a system that communicate with one another. For example field devices of an automation system can communicate amongst one another, with a server, or with portable communications devices such as tablet PCs or smartphones that are used for maintenance purposes.

A portable communications device, such as a cellphone or a smartphone, is part of the standard equipment for people working in the field of automation systems. Thus the method for authorizing a user by a portable communications device constitutes a simplified method for role-based access control that makes use of the advantages of mobile communications technology.

In one embodiment, the method comprises the following steps:

For the purpose of acquiring the first information, the user photographs a code, in particular a one-dimensional barcode or two-dimensional quick response code (QR code for short), using the portable communications device, in particular a cellphone having a built-in camera. The portable communications device decodes the code and sends the first information to a server by an SMS (Short Message Service) message via a telecommunications service.

In this embodiment, a method that reduces errors arising during identification, for instance those caused by input mistakes, is used to identify the field device.

By virtue of the portable communications device sending the first information for identifying the field device to the system, which is embodied as a server, by an SMS message via a telecommunications service, it is possible to jointly send the first information and the second information for identifying the portable communications device itself. In this regard, the portable communications device can be identified, for example, by the cellphone number of the sent SMS message. In addition, technologies such as instant messaging or emailing can also be used for transmitting the first information. Identification is then performed by the authentication at the instant messaging server or via the signature of an email.

According to another embodiment, the system assigns a first password to a combination of the first information and the second information according to a fixed rule. In addition, the system defines the first password as the first piece of access information on the basis of the combination. The field device assigns a second password to the combination likewise according to the fixed rule, and defines the second password as the second piece of access information on the basis of the combination.

In this embodiment, the system sends a static password, and determines this static first password on the basis of the combination. The field device has a local database in which are stored, for possible combinations of the first information and the second information, the associated passwords according to the assignment by the system.

According to a further advantageous embodiment of the method, the system and the field device are provided with a shared secret. Furthermore, the portable communications device sends a date in addition to the first information and the second information to the system. The system uses the shared secret to calculate from the first information, the second information and the date, a first one-off password as the first piece of access information. The field device uses the shared secret to calculate from the second information and the date and from the first information known to the field device, a second one-off password as the second piece of access information.

The shared secret may be a one-way function such as, for instance, a hash function (SHA-1, SHA-256 etc.) or a keyed hash function, also known as a message authentication code (MAC) (HMAC-SHA-1, HMAC-SHA-256, etc.). In addition, symmetric encryption algorithms such as, for instance, the Data Encryption Standard (DES), Triple Data Encryption Standard (3DES) or Advanced Encryption Standard (AES) can be used in what is known as cipher block chaining MAC mode (CBC MAC mode).

Using one-way functions to calculate one-off passwords makes it unnecessary to send static passwords. Static passwords constitute a security risk, primarily because they can be intercepted, for example, by an attacker gaining access to the information exchanged with the mobile device.

In the present patent application, a date is understood to mean a specification for defining a time period within which the generated one-off password is valid. For example, it is the specification of the date for that day, with the generated one-off password being valid in this case for the specified day.

According to another embodiment, the system is provided with a first secret and a second secret, and the field device is provided with the second secret. The portable communications device sends a date in addition to the first information and the second information to the system. The system assigns a first password to the second information according to a fixed rule and uses the first secret to calculate an interim password on the basis of the first information, the second information and the first password. The system then uses the second secret to calculate, from the interim password and the date, a first session-specific one-off password as the first piece of access information.

The field device determines the interim password from the second information, where the field device has no knowledge of the first password and also cannot determine this first password. Finally, the field device uses the second secret to calculate, from the interim password and the date, a second session-specific one-off password as the second piece of access information.

This embodiment enables central administration of access data on the system, where, for instance, the second information, which identifies the portable communications device or the user thereof, is assigned the associated password. For example, a list exists containing all service engineers working in the automation system together with their respective passwords. This also aids auditability, which is often required for administrative actions.

In one embodiment, it may not be possible for the field device to determine the static passwords associated with the second information. The field device only has knowledge of an assignment of the second information to the interim password, which is device-specific and is derived from the first information, the second information, and the role-specific password known only to the system and which can be calculated by the system. Storing and using the device-specific password on the field device implements a local association with the device and hence reduces the risk that passwords that are used system-wide, (e.g., role-specific passwords) can be misused if a field device is compromised.

In another embodiment, the second information is in the form of a telephone number of the user, to which telephone number the system assigns a role.

An Internet-compatible smartphone, which can open an Internet Protocol connection to Internet services, can also be used for transmitting the second information. For example, a symbolic name of a user, like an alias or nickname, can be used. In one embodiment, the certificate of a user is used to verify a signed email.

Hence a cellphone can be used by a plurality of different users for authorization. The role is then specified by the telephone number. This can be advantageous, particularly if a plurality of roles are assigned to a user.

According to a further embodiment, the second information includes a specification of a role of the user.

Thus, it is specified in which role a user would like to be authorized using a portable communications device.

In one embodiment, the second information and/or the first piece of access information and/or the date for transmitting from the portable communications device to the field device are entered on an input area of the field device. In this regard, the field device merely includes a minimum interface for entering the information. This is advantageous particularly when the information exists in the form of numbers.

In one embodiment, the second information and/or the first piece of access information and/or the date are transmitted via wireless interfaces from the portable communications device to the field device.

The cellphone of the person working on the automation system usually has interfaces for near field communication (NFC) such as, for instance, for the radio frequency identification application (RFID application). If the field device to be administered also has a suitable interface, then login data in the form of the second information or the first piece of access information can be communicated in a locally restricted manner. This dispenses with manual input of the login data and reduces the transmission error rate caused by reading errors or input mistakes.

In one embodiment, there is an access control system for authorizing a user at a field device by a portable communications device, comprising:
  the portable communications device for acquiring first information, for sending the first information and sending second information to a computer platform, and for sending the second information and a first piece of access information to the field device;
  a computer platform having server functionality for receiving the first information and the second information, for determining the first piece of access information on the basis of the first information and the second information, and for sending the first piece of access information to the portable communications device;
  field device for determining a second piece of access information on the basis of the second information, and for allowing access to the field device on the basis of a comparison of the first piece of access information and the second piece of access information.

In one embodiment, the access control system also comprises at least one further unit for use in one of the method steps according to the above-mentioned method.

BRIEF DESCRIPTION OF THE DRAWINGS

The properties, features and advantages of this invention that are described above and also the manner in which they are achieved will become clearer and more distinctly comprehensible in connection with the description that follows for the exemplary embodiments, which are explained in more detail in connection with the drawings, in which.

DETAILED DESCRIPTION OF THE PRESENTLY PREFERRED EMBODIMENTS

Figure 1:
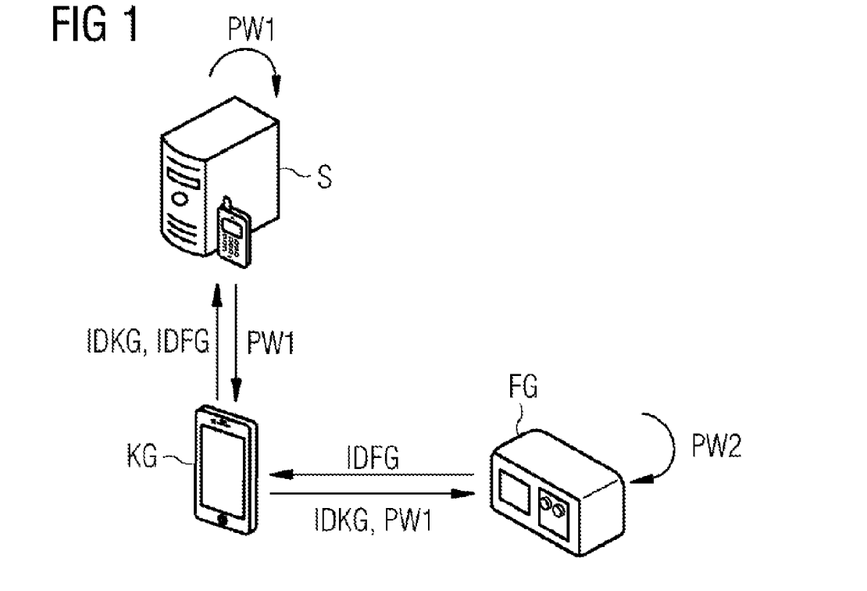
FIG. 1 is a schematic diagram of the authorization method according to a first exemplary embodiment.

A first exemplary embodiment is described by way of example in the automation engineering sector (e.g., in the field of industrial automation or energy automation), with reference to FIG. 1. A field device FG inside an automation system has attached to it a sticker on which a quick response code (QR code) is depicted. Alternatively, this QR code can also be displayed by a display present on the field device.

Barcodes, which visually represent information about an object by varying the width and separation of parallel lines, and which are specific to an object, are known from the prior art. QR codes are likewise known, which represent a barcode in matrix form, where black elements are arranged in a square pattern on a white background. The coded information may be, for example, binary or alphanumeric data.

In one example, a service engineer may have access to the field device FG in order to carry out maintenance work on the field device FG, to replace the field device FG, or to define configuration settings. Intervention by a person having appropriate authorization is used in the energy automation sector, for instance if parameters need to be adjusted, when checks are made, or data is read. The persons involved may be service engineers (e.g., engineers or other persons authorized for specified actions within the automation system).

In various embodiments, it is not the person with their name that is relevant but merely a role that is associated with the permissions for certain actions. A role can be specified, for example, by using a communications device KG. In this embodiment, the role of the service engineer is specified for a user of the communications device KG, which can be identified via a telephone number for example. The user of the portable communications device KG then starts a method for authorization at the field device FG by photographing the QR code located on the field device FG. A portable communications device KG (e.g., a cellphone or smartphone), is part of the standard equipment for personnel working in the environment of an automation system. Such cellphones or smartphones are usually equipped with a camera, and therefore it is easily possible to photograph the barcode.

The portable communications device KG decodes the QR code and thus obtains first information IDFG about the field device FG, such as an identification number, device identifier or a serial number for example. The first information IDFG in the form of the serial number of the field device FG is sent to a server S via a telecommunications service (short message service, SMS). By sending the SMS message, the server S is simultaneously provided with second information IDKG identifying the portable communications device KG together with the first information IDFG. In this example, a telephone number of the portable communications device is transmitted for this purpose, where the second information IDKG additionally includes a role of the user. By transmitting the telephone number, at least part of information about the role of the user is simultaneously known to the server S, because the server S stores the cellphones within an automation system together with the role information associated with each. Thus the correct role is also assigned to a cellphone when a cellphone having a plurality of users is used, provided a cellphone is meant to be used in assigning the role.

Accordingly, the server S can determine a first piece of access information ZI1 on the basis of the first information IDFG, the second information IDKG or on the basis of a combination KOMB of the first information IDFG and the second information IDKG. This first piece of access information is a first password PW1, which is assigned to each user of the portable communications device KG for access to field devices within the automation system that belong to a specific device class.

In one embodiment, the server S is provided for this purpose with all the cellphone numbers within the automation system, and each cellphone number is associated with a role. In addition, a field device class is assigned to each communicated serial number of a field device, for instance by a specific number block within the serial number defining the device class.

The server S sends the first password PW1 back to the portable communications device KG likewise by an SMS message. The user of the portable communications device KG now enters at the user interface of the field device FG, which is configured for entries such as numbers, the second information IDKG in the form of the role of the user. The field device FG now determines, on the basis of an assignment that matches the assignment on the server S, the second password PW2 assigned on the field device FG to the role.

If the second password PW2 determined by the field device FG matches the first password PW1 entered at the field device FG by the user, the user is authorized for access to the field device FG.

Figure 2:
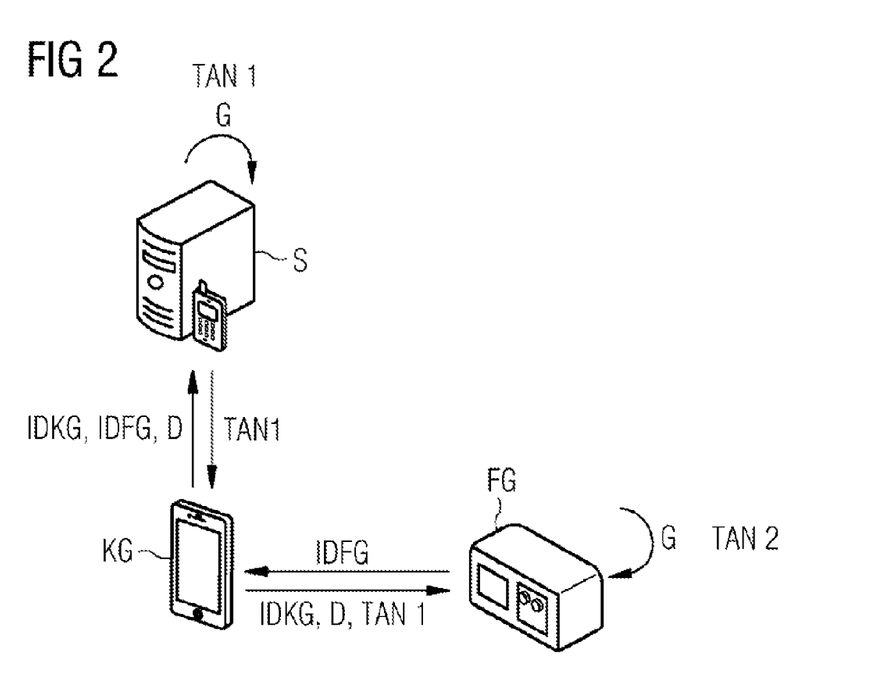
FIG. 2 is a schematic diagram of the authorization method according to a second exemplary embodiment.

A further exemplary embodiment is now described with reference to FIG. 2. In this example, a portable communications device KG acquires first information IDFG for identifying a field device FG and sends this information together with second information IDKG to a server S by an SMS message. A date D is additionally sent in this process. In a variant of the exemplary embodiment, the server S acquires the date D by recording the time at which the SMS message was received.

A shared secret G exists for the server S and the field device FG. The server S uses this secret to calculate a one-off password TAN1, which is specified by the first information IDFG, the second information IDKG and the date D. In this embodiment, for every cellphone number that is transmitted by the SMS message, a name of the user of the cellphone is stored on the server S, and again a role is assigned to each user.

The calculation that incorporates the shared secret G can be a one-way function such as, for instance a hash function (SHA-1, SHA-256 etc.) or a keyed hash function, also known as a message authentication code (MAC) (HMAC-SHA-1, HMAC-SHA-256, etc.). In addition, symmetric encryption algorithms such as, for instance, the Data Encryption Standard (DES), Triple Data Encryption Standard (3DES) or Advanced Encryption Standard (AES) can be used in what is known as cipher block chaining MAC mode (CBC MAC mode).

Such functions make it is possible to generate on the basis of information provided or communicated to the server S values that are nearly impossible to generate in the same way when different information is provided.

Thus, for instance, by using a secret G shared by the server S and the field device FG, a first one-off password TAN1 and a second one-off password TAN2 are generated as the respective hash values. If the hash value generated on the server S does not match the hash value generated on the field device FG, it is indicates that the data (e.g., date D) communicated to the server S or the field device is incorrect or has been tampered with.

The one-off password TAN1 is in turn sent to the portable communications device KG in the form of an SMS message. The second information IDKG and the date D are included in the one SMS message.

Both the portable communications device KG and the field device FG have a near field communications interface (NFC interface), for example an RFID interface, via which login data can be communicated in a locally restricted manner. An NFC technique for providing the data on the field device FG can be used for the transmission of the second information IDKG, the date D and the first one-off password TAN1, where the cellphone is used in a similar manner to a smartcard and the field device FG is used as a reading medium.

Apart from RFID techniques, other NFC techniques such as Bluetooth may be used to access a SIM card of a cellphone or to access selected data.

The field device FG calculates the second one-off password TAN2 on the basis of the same one-way function as that of the server S on the basis of the communicated second information IDKG, the date D and the first information IDFG known to the field device FG.

By virtue of the server sending the second information IDKG, it is also possible to send different role information to the user. This may depend, for instance, on the time or even the geographic position of the location of the user or of the portable communications device KG. In one embodiment, the location is determined using methods such as the Global Positioning System or triangulation. The Cisco Wireless Location Appliance, in which a multiplicity of devices are recorded at the same time as their location by WLAN (Wireless Local Area Network), can be used as a locating technique in this context.

If the second one-off password TAN2 calculated matches the communicated one-off password TAN1, clearance to access the field device FG is again given.

A combination of static password assignment and generation of one-off passwords is now presented in a third exemplary embodiment. The authorization of a user of a portable communications device KG, for example a person working in an automation system having the role of an engineer, at a field device FG of the automation system, is explained with reference to FIG. 3. For example, the field device FG is configured such that in response to a command such as, for instance, the user pressing a button, it can generate a flicker code. A flicker code consists of flickering black and white areas and is randomly generated anew every time the button is pressed. Alternatively, in one embodiment, a freshly generated QR code can also be displayed. The main feature is that this code is not static. Thus, if the first information IDFG for identifying the field device FG is acquired, any misuse such as, for instance, deleting or copying a code permanently located on the field device FG, is difficult.

Figure 3:
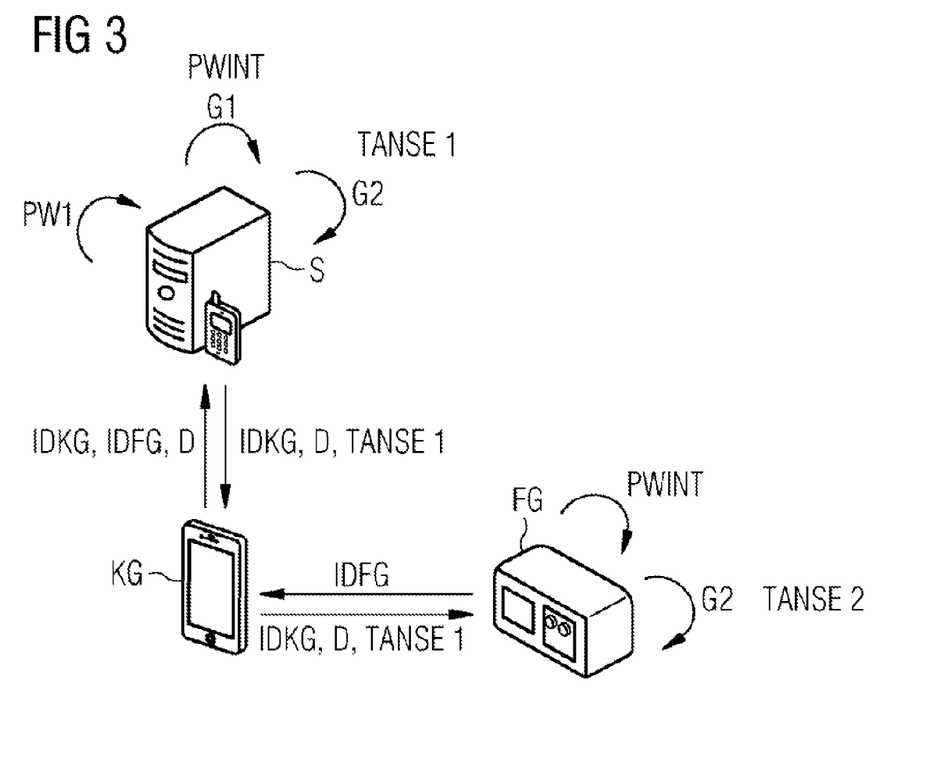
FIG. 3 is a schematic diagram of the authorization method according to a third exemplary embodiment.

The portable communications device KG of the user (e.g., smartphone of the engineer), may be used to capture the flicker code by a camera in a similar manner to the method described above.

Using the smartphone to photograph a non-static code can additionally prevent deception by external intervention, because the first information is acquired locally at the field device by the portable communications device.

The flicker code is decoded by the portable communications device KG, and the decoded information is sent as first information IDFG to a server S via an SMS message. The server S is designed for the elements of the automation system to communicate with one another. In addition, by sending the SMS message, further information IDKG is communicated, which in this embodiment is designed such that the role of the user is specified explicitly to the user. This avoids uncertainty if a user wants to log on using different roles. In addition, a date D is communicated that is defined by the time at which the SMS message was sent.

On the server S, the second information IDKG is now assigned to a first password PW1. The server S is provided with a table for this purpose, which assigns a role-specific password, the first password PW1, to each role.

The server uses a first secret G1, which is incorporated in a one-way function such as a hash function, to calculate an interim password PWINT on the basis of the second information IDKG, which specifies the role, the first password PW1, which is role-specific, and the first information IDFG, which comprises the decoded information from the flicker code (e.g., the serial number).

The server S uses a second secret G2 to calculate on the basis of the interim password PWINT and the communicated date D a first session-specific one-off password TANSE1. MAC techniques may be used for this purpose. Then the second information IDKG, the date D and the session-specific one-off password TANSE1 are sent back to the portable communications device KG of the engineer by an SMS message.

The data required for authorization is entered at the field device FG via wireless communications technologies such as NFC. A suitable interface is provided for this purpose both on the portable communications device KG and on the field device FG.

The field device FG now determines, from the second information IDKG, the interim password PWINT, which is assigned to the role of the user to be authorized. In this embodiment, there is an assignment of a role to interim password PWINT, which comprises a device-specific derivation of the role-specific password PW1. The field device FG, however, is unable to determine the first password, and therefore in the event of the field device FG being compromised, only passwords can be identified that apply to the compromised field device itself. The field device FG uses the second secret G2 to determine, on the basis of the interim password PWINT and the communicated date D, a second session-specific one-off password TANSE2.

In one embodiment, the date D is defined in the form that when the time is defined, a time period is also defined for which the time is itself meant to be used for determining the one-off passwords. For example, when sending the SMS message from the portable communications device KG to the server S, the time of sending can be defined using the smallest unit of the minute, and additionally a predetermined time unit (e.g., of ten minutes). If the date D, i.e. the original send time and the time unit, is transmitted from the portable communications device KG to the field device FG within the defined time unit, then the field device FG uses the original send time to calculate the second session-specific one-off password TANSE2. In order to determine whether the requests for the first session-specific one-off password TANSE1 by the portable communications device KG and the transmission of the data required for authorization by the user at the field device FG take place within the specified time unit, the field device FG compares the send time with the time of transmission of the login data to the field device FG.

If the first session-specific one-off password TANSE1 and the second session-specific one-off password TANSE2 match, then access to the field device FG is again allowed.

The units of portable communications device (KG), computer platform, field device (FG) and the further unit can be implemented and embodied in software, hardware or a combination of software and hardware.

Thus the steps implemented by the units can be stored as program code on a storage medium, in particular on a hard disk, CD-ROM or a memory module, wherein the individual instructions of the program code are read and processed by at least one processing unit comprising a processor.

The processor is connected to the storage medium via a bus for the purpose of data transfer.

In addition, an input/output unit can be connected via the bus, by which input/output unit it is possible to receive and/or send data such as messages, for example.

The embodiments and exemplary embodiments described can be combined with one another in any way. Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for authorizing a user at a field device by a portable communications device, the method comprising:
   acquiring a first information by the portable communications device for identifying the field device;
   sending to a system the first information and sending a second information including information which identifies (i) the portable communications device and (ii) a role of the user thereof, by the portable communications device;
   determining, by the system, a first piece of access information on the basis of the first information and the second information, and sending by the system the first piece of access information to the portable communications device;
   transmitting by the portable communications device the second information including the information which identifies (i) the portable communications device and (ii) the role of the user thereof, and the first piece of access information to the field device;
   determining, by the field device, a second piece of access information on the basis of the second information including the information which identifies (i) the portable communications device and (ii) the role of the user thereof, and comparing the first piece of access information with the second piece of access information; and
   allowing access to the field device upon determining that the first piece of access information and the second piece of access information match,
   wherein:
   the system and the field device are provided with a shared secret;
   the portable communications device sends a date in addition to the first information and the second information to the system;
   the system uses the shared secret to calculate from the first information, the second information and the date, a first one-time password as the first piece of access information; and
   the field device uses the shared secret to calculate, from the second information and the date and from the first information known to the field device, a second one-time password as the second piece of access information.

2. The method as claimed in claim 1, further comprising:
   obtaining at least one of: (i) a one-dimensional barcode and (ii) a two-dimensional quick response code, by the portable communications device operative for acquiring the first information, wherein the portable communications device decodes the code; and
   sending, by the portable communications device, the first information to the system by an SMS message via a telecommunications service, wherein the system is a server.

3. The method as claimed in claim 1, wherein:
   the system assigns a first password to a combination of the first information and the second information according to a fixed rule;
   the system defines the first password as the first piece of access information on the basis of the combination;
   the field device assigns a second password to the combination according to the fixed rule; and
   the field device defines the second password as the second piece of access information on the basis of the combination.

4. The method as claimed in claim 1, wherein the second information is in the form of a telephone number of the user, to which telephone number the system assigns a role.

5. The method as claimed in claim 1, wherein the second information includes a specification of a role of the user.

6. The method as claimed in claim 1, wherein at least one of: (i) the second information, (ii) the first piece of access information, and (iii) a date for transmitting from the portable communications device to the field device are entered on an input area of the field device.

7. The method as claimed in claim 1, wherein at least one of: (i) the second information, (ii) the first piece of access information, and (iii) a date are transmitted via wireless interfaces from the portable communications device to the field device.

8. A method for authorizing a user at a field device by a portable communications device, the method comprising:

acquiring a first information by the portable communications device for identifying the field device;
sending to a system the first information and sending a second information including information which identifies (i) the portable communications device and (ii) a role of the user thereof, by the portable communications device;
determining, by the system, a first piece of access information on the basis of the first information and the second information, and sending by the system the first piece of access information to the portable communications device;
transmitting by the portable communications device the second information including the information which identifies (i) the portable communications device and (ii) the role of the user thereof, and the first piece of access information to the field device;
determining, by the field device, a second piece of access information on the basis of the second information including the information which identifies (i) the portable communications device and (ii) the role of the user thereof, and comparing the first piece of access information with the second piece of access information; and
allowing access to the field device upon determining that the first piece of access information and the second piece of access information match,
wherein:
the system is provided with a first secret and a second secret;
the field device is provided with the second secret;
the portable communications device sends a date in addition to the first information and the second information to the system;
the system assigns a first password to the second information according to a fixed rule;
the system uses the first secret to calculate an interim password on the basis of the first information, the second information and the first password;
the system uses the second secret to calculate, from the interim password and the date, a first session-specific one-time password as the first piece of access information;
the field device determines the interim password from the second information, where the field device has no knowledge of the first password and also cannot determine this first password; and
the field device uses the second secret to calculate, from the interim password and the date, a second session-specific one-time password as the second piece of access information.

9. An access control system, comprising:
a portable communications device configured to acquire a first information, send the first information, send a second information including information which identifies (i) the portable communications device and (ii) a role of the user thereof to a computer platform, and send the second information and a first piece of access information to the field device;
a computer platform having a server configured to receive the first information and the second information including the information which identifies (i) the portable communications device and (ii) the role of the user thereof, determine the first piece of access information on the basis of the first information and the second information including the information which identifies (i) the portable communications device and (ii) the role of the user thereof, and to send the first piece of access information to the portable communications device; and
a field device including a processor which determines a second piece of access information based on the second information, and allows access to the field device based on a comparison of the first piece of access information and the second piece of access information;
wherein a user is authorized at the field device by the portable communications device, and
wherein:
the system and the field device are provided with a shared secret;
the portable communications device sends a date in addition to the first information and the second information to the system;
the system uses the shared secret to calculate from the first information, the second information and the date, a first one-time password as the first piece of access information; and
the field device uses the shared secret to calculate, from the second information and the date and from the first information known to the field device, a second one-time password as the second piece of access information.

10. An access control system, comprising:
a portable communications device configured to acquire a first information, send the first information, send a second information including information which identifies (i) the portable communications device and (ii) a role of the user thereof to a computer platform, and send the second information and a first piece of access information to the field device;
a computer platform having a server configured to receive the first information and the second information including the information which identifies (i) the portable communications device and (ii) the role of the user thereof, determine the first piece of access information on the basis of the first information and the second information including the information which identifies (i) the portable communications device and (ii) the role of the user thereof, and to send the first piece of access information to the portable communications device; and
a field device including a processor which determines a second piece of access information based on the second information, and allows access to the field device based on a comparison of the first piece of access information and the second piece of access information;
wherein a user is authorized at the field device by the portable communications device, and
wherein:
the system is provided with a first secret and a second secret;
the field device is provided with the second secret;
the portable communications device sends a date in addition to the first information and the second information to the system;
the system assigns a first password to the second information according to a fixed rule;
the system uses the first secret to calculate an interim password on the basis of the first information, the second information and the first password;
the system uses the second secret to calculate, from the interim password and the date, a first session-specific one-time password as the first piece of access information;

the field device determines the interim password from the second information, where the field device has no knowledge of the first password and also cannot determine this first password; and the field device uses the second secret to calculate, from the interim password and the date, a second session-specific one-time password as the second piece of access information.

\* \* \* \* \*